United States Patent [19]

Jansen

[11] Patent Number: 4,790,946

[45] Date of Patent: Dec. 13, 1988

[54] PROCESS FOR THE PREPARATION OF A DISINFECTANT FOR WATER, SUCH AS DRINKING- OR SWIMMING-WATER

[76] Inventor: Hermanus J. Jansen, 's -Gravenweg 108, 2911 CH Nieuwerkerk a/d IJssel, Netherlands

[21] Appl. No.: 900,743

[22] Filed: Aug. 27, 1986

[30] Foreign Application Priority Data

Aug. 27, 1985 [NL] Netherlands ............... 8502355

[51] Int. Cl.$^4$ ............................................. C02F 1/50
[52] U.S. Cl. ................................... 210/748; 210/756; 210/764; 204/98
[58] Field of Search ............... 210/683, 748, 754, 756, 210/764, 169, 192, 198.1; 204/98, 149

[56] References Cited

U.S. PATENT DOCUMENTS

| | | | |
|---|---|---|---|
| 3,926,771 | 12/1975 | Lieb et al. ................ | 210/198.1 |
| 4,085,028 | 4/1978 | McCallum ................ | 210/169 X |
| 4,397,720 | 8/1983 | Moore et al. ............. | 210/749 X |
| 4,483,754 | 11/1984 | Shiroki .................... | 210/683 X |
| 4,555,323 | 11/1985 | Collier .................... | 210/169 X |
| 4,584,071 | 4/1986 | Bissot .................... | 210/683 X |

Primary Examiner—Tom Wyse

[57] ABSTRACT

The invention concerns a process and apparatus for the preparation of a disinfectant for water, such as drinking- or swimming-water by electrolysis of an aqueous NaCl-containing solution.

In order to improve these, the process of the invention is characterized in that an NaOCl-containing solution obtained by electrolysis is enriched with electrolytically obtained $Cl_2$ by either electrolytically preparing an aqueous NaCl and NaOCl-containing solution and further electrolyzing said solution to partially convert the Nacl still present therein into $Cl_2$, or electrolytically preparing a mixture of an aqueous NaCl solution and $Cl_2$, and further electrolyzing said mixture to partially convert the NaCl still present therein into NaOCl.

The apparatus of the invention is characterized by a combination of a first electrolytic cell (1) and a second electrolytic cell (2), which are electrically series-connected, said first electrolytic cell (1) being provided with a brine supply line (8) and a discharge line (10,11) and comprising a plurality of pairs of electrodes (A1, K1... A5, K5), no separation being present between the anode and the cathode of each pair of electrodes, and said second electrolytic cell (2) comprising one or more pairs of electrodes (A6, K6), a diaphragm or ion-selective membrane (5) being positioned between the anode (A6) and the cathode (K6) of the or each pair of electrodes, in which second electrolytic cell (2) the anode space(s) (6) is (are) connected to the discharge line (11) of the first electrolytic cell and to a product discharge line (15), and the cathode space(s) (7) is (are) provided with a supply line (12) and a discharge line (13,14).

5 Claims, 2 Drawing Sheets

PROCESS FOR THE PREPARATION OF A DISINFECTANT FOR WATER, SUCH AS DRINKING- OR SWIMMING-WATER

The invention generally relates to processes and apparatuses for the preparation of a disinfectant for water, such as drinking- or swimming-water, by electrolysis of an aqueous NaCl solution.

For disinfecting water, such as drinking- or swimming-water, use is often made of chlorine or a chlorine-containing solution prepared by electrolysis of an aqueous NaCl solution in the place where the disinfectant is required.

It is known to carry out the electrolysis in a hypochlorite generator, i.e. an electrolytic cell having a plurality of anodes and cathodes in which the products formed at the anodes and at the cathodes are not kept separated from each other, so that they can freely mix together to form a diluted NaOCl-containing solution, the pH of which ranges between 9 and 10. The use of such a solution as a disinfectant for water has the drawback that the pH of the water increases owing to disinfection and must be corrected by addition of acid to obtain a desired value which must be within legally prescribed limits in many countries. A further drawback of the use of a hypochloride generator is that chlorine formed therein is partially reduced at the cathode, as a result of which it is not possible to obtain a high degree of conversion of the NaCl without an increasing consumption of electricity.

It is also known to carry out the electrolysis in an electrolytic cell having anode and cathode spaces separated by a diaphragm or an ion-selective (often cation-selective) membrane. In the anode spaces of such a cell chlorine gas is formed, while in the cathode spaces sodium hydroxide solution is formed. Reduction of the chlorine formed at the cathode is not possible, because the chlorine cannot contact the cathode. When water is disinfected with the chlorine gas developed, the pH of the water decreases, but addition of the sodium hydroxide solution formed in the cell can restore the pH, so that no external material is required for the pH correction. A drawback of this process, however, is that it can be dangerous to work with chlorine gas, which is therefore not allowed in some countries, unless very stringent security regulations are satisfied.

It has now been found that by combining the above-described known processes there is obtained a disinfectant for water which contains no free chlorine gas and has such a pH that correction of the water treated with the disinfectant is superfluous.

The process according to the invention is characterized in that an NaOCl-containing solution obtained by electrolysis is enriched with the electrolytically obtained Cl by either electrolytically preparing an aqueous NaCl and NaOCl-containing solution and further electrolyzing said solution to partially convert the NaCl still present therein into $Cl_2$, or electrolytically preparing a mixture of an aqueous NaCl-solution and $Cl_2$, and further electrolyzing said mixture to partially convert the NaCl still present therein into NaOCl.

In a first embodiment of the process according to the invention the aqueous NaCl solution is passed through and electrolyzed in a first electrolytic cell having a plurality of pairs of electrodes in which the products formed at the anodes and at the cathodes are not kept separated from each other to form an NaCl and NaOCl-containing solution, after which the resulting solution is further passed through and electrolyzed in one or more anode spaces of a second electrolytic cell which is electrically series-connected with the first electrolytic cell and has one or more of pairs of electrodes in which a diaphragm or ion-selective membrane is positioned between the anode and the cathode of the or each pair of electrodes.

In this first embodiment the product of a hypochlorite generator consisting of an NaCl and NaOCl-containing solution is used as a feed for the anode space(s) of a diaphragm or membrane cell. In this (these) anode space(s) the NaCl still present in the solution is partially converted into chlorine whereby reduction to chloride cannot take place. Consequently, the degree of conversion of the NaCl increases, while the NaCl and NaOCl containing solution is enriched with the chlorine, resulting in a decrease of the pH of the solution.

In a second embodiment of the process according to the invention the aqueous NaCl solution is passed through and electrolyzed in a first electrolytic cell having one or more pairs of electrodes in which a diaphragm or ion-selective membrane is positioned between the anode and the cathode of the or each pair of electrodes, after which the products leaving the anode space(s) of the cell are further passed through and electrolyzed in a second electrolytic cell which is electrically series-connected to the first electrolytic cell and has a plurality of pairs of electrodes in which the products formed at the anodes and the cathodes are not kept separated from each other.

In this second embodiment the products of the anode space(s) of a diaphragm or membrane cell (chlorine gas and NaCl solution) are used as a feed for a hypochlorite cell in which the products of both cells are completely mixed. In the hypochlorite generator a portion of the NaCl present in the feed is electrolyzed to form an NaCl and NaOCl-containing solution which is enriched with the chlorine from the anode space(s) of the diaphragm or membrane cell, resulting in a decrease of the pH of the solution.

In a third embodiment of the process according to the invention the aqueous NaCl solution is passed through and electrolyzed in one or more electrically series-connected electrolytic cells having a plurality of pairs of electrodes in which a diaphragm or ion-selective membrane is positioned between the anode and the cathode of each pair of electrodes, wherein the products leaving a part of the anode and cathode spaces are quantitatively mixed together to form an aqueous NaCl and NaOCl-containing solution, after which the resulting solution is further passed through and electrolyzed in the other anode space(s) of the cell(s).

In this third embodiment use is made of one or more diaphragm or membrane cells having a plurality of anode and cathode spaces. The products of a part of the anode spaces (chlorine gas and NaCl solution) are quantitatively mixed with the products of the associate cathode spaces (Na Cl and NaOH-containing solution) to form an NaCl and NaOCl-containing solution used as a feed for the remaining anode space(s) in which a portion of the NaCl present in the feed is converted into chlorine with which the NaCl and NaOCl-containing solution is enriched, resulting in a decrease of the pH of the solution.

The invention also relates to apparatuses for carrying out the process according to the invention in its various embodiments.

The apparatus for carrying out the process according to the invention in its first embodiment is characterized by a combination of a first electrolytic cell and a second electrolytic cell, which are electrically series-connected, said first electrolytic cell being provided with a brine supply line and a discharge line and comprising a pair of electrodes, no separation being present between the anode and the cathode of each pair of electrodes, and said electrolytic cell comprising one or more pairs of electrodes, a diaphragm or ion-selective membrane being positioned between the anode and the cathode of the or each pair of electrodes, in which second electrolytic cell the anode space(s) is (are) connected to the discharge line of the first electrolytic cell and to a product discharge line, and the cathode space(s) is (are) provided with a supply line and a discharge line.

The apparatus for carrying out the process according to the invention in its second embodiment is characterized by a combination of a first electrolytic cell and a second electrolytic cell, which are electrically series-connected, said first electrolytic cell comprising one or more pairs of electrodes, a diaphragm or an ion-selective membrane being positioned between the anode of the cathode of the or each pair of electrodes, in which first electrolytic cell the anode space(s) is (are) connected to a brine supply line and to a discharge line and the cathode space(s) is (are) provided with a supply line and a discharge line, and which second electrolytic cell is connected to the discharge line of the anode space(s) of the first electrolytic cell and to product discharge line and comprises a plurality of pairs of electrodes, no separation being present between the anode and the cathode of each pair of electrodes.

The apparatus for carrying out the process according to the invention in its third embodiment is characterized by one or more electrolytic cells comprising a plurality of electrically series-connected subcells each consisting of an anode space defined by an anode or the anodically functioning surface of a bipolar electrode and a diaphragm or ion-selective membrane, and a cathode space defined by the diaphragm or ion-selective membrane and a cathode or the cathodically functioning surface of a bipolar electrode, the anode spaces and the cathode spaces of a plurality of subcells communicating with each other and with a mixing chamber, said mixing chamber being connected to the anode space(s) of the remaining subcell(s).

In the process according to the invention in its various embodiments it is of great importance that the degree of enrichment of the hypochlorite solution with $Cl_2$, in other words, the mixing ratio of $NaOCl/Cl_2$, is properly controlled. In case of enrichment with too much $Cl_2$, free chlorine gas remains in the final product, and in case of enrichment with too little $Cl_2$ the pH of the resulting solution is insufficiently reduced, so that, when water is disinfected with the final product, the pH of the treated water is increased and pH correction is necessary.

According to the invention the mixing ratio of $NaOCl/Cl_2$ can be closely controlled by electrically series-connecting the cell units in which NaOCl is formed with the cell or cell units in which $Cl_2$ is developed, and by selecting in the correct ratio the plurality of cell units in which NaOCl and $Cl_2$, respectively, are formed. This ratio depends on the desired pH of the disinfectant and on the flow rate of the brine feed.

If these conditions are met, the mixing ratio of $NaOCl/Cl_2$ will practically constantly retain the selected value, also in case of fluctuations in current intensity and/or the activity of one or more cell units.

The invention will be illustrated by the accompanying drawing, in which

Figure 1:
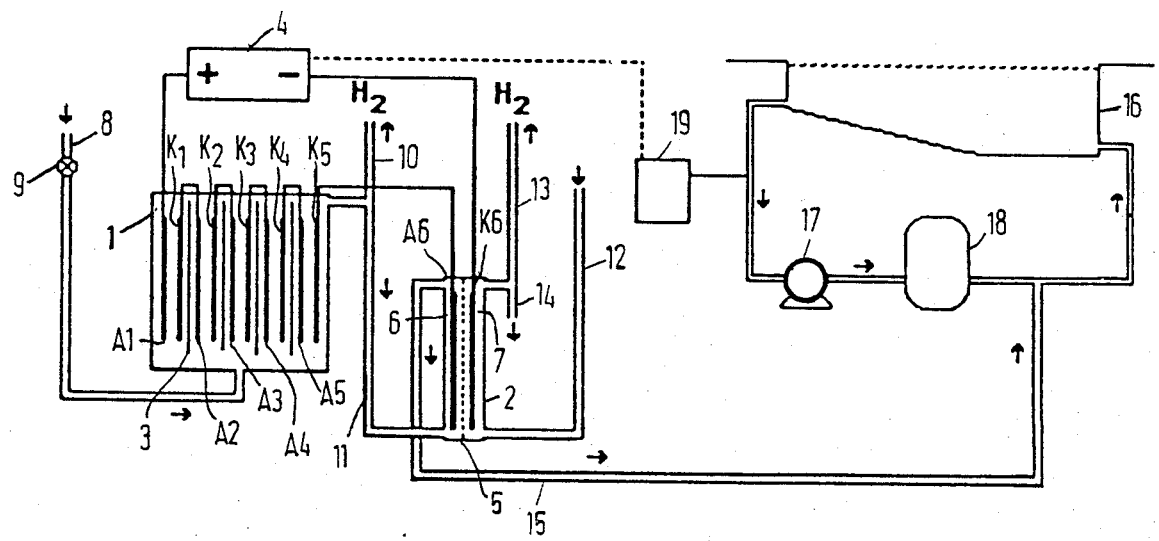
FIG. 1 is a schematic representation of an apparatus for carrying out the process according to the invention in its first embodiment.

FIG. 1 shows a hypochlorite generator 1 and a subsequent membrane cell 2 connected thereto. The hypochlorite generator comprises five electrically series-connected cell units each consisting of an anode A1 through A5 and a cathode K1 through K5. The anode and the cathode of a cell unit are not spatially separated from each other. Interposed between the cell units are partitions 3 in such a manner that the products of all cell units can freely mix together at the top of the cell. The anode A1 of the first cell unit is connected to the positive pole of an electric source 4; the cathode K1 of the first unit is connected to the anode A2 of the second unit; the cathode K2 of the second unit is connected to the anode A3 of the third unit, etc.

The membrane cell 2 comprises one anode A6 and one cathode K6 and is divided by a cation-selective membrane 5 into an anode space 6 and a cathode space 7. The anode A6 is connected to the cathode K5 of the fifth cell unit of the hypochlorite generator 1 and the cathode K6 of the membrane cell 2 is connected to the negative pole of the electric source 4.

The hypochlorite cell 1 is fed via line 8 with an aqueous NaCl solution metered via a control valve 9. The product consisting of hydrogen gas and an aqueous solution of NaCl and NaOCl is discharged from the cell. The hydrogen gas escapes via separator 10 and the solution overflows into the anode space 6 of membrane cell 2, in which chlorine gas is electrolytically formed from a part of the NaCl present in the solution, which chlorine gas is absorbed in the NaOCl-containing solution and lowers the pH thereof.

The cathode space 7 is fed with an aqueous NaCl solution supplied via line 12. The NaCl concentration of this solution is not critical, but must be sufficiently electrically conductive. In practice, the same solution can be used for feeding the membrane cell 2 as for feeding the hypochlorite generator 1. In the cathode space hydrogen gas and NaOH and NaCl-containing solution ar formed by the electrolysis reaction. The hydrogen gas escapes via separator 13 and the solution is discharged via line 14.

The product solution overflowing from the anode space 7 is discharged via line 15 and can be used for disinfecting swimming-water in a swimming-pool 16. For this purpose the swimming-water is circulated by means of a pump 17 via a filter 18, the resulting disinfectant being fed to the circulation line via line 15. The chlorine content of the swimming-water can be automatically maintained by measuring the chlorine content in the circulation line and switching on and off the electric source 4 by means of a control device 19.

Figure 2:
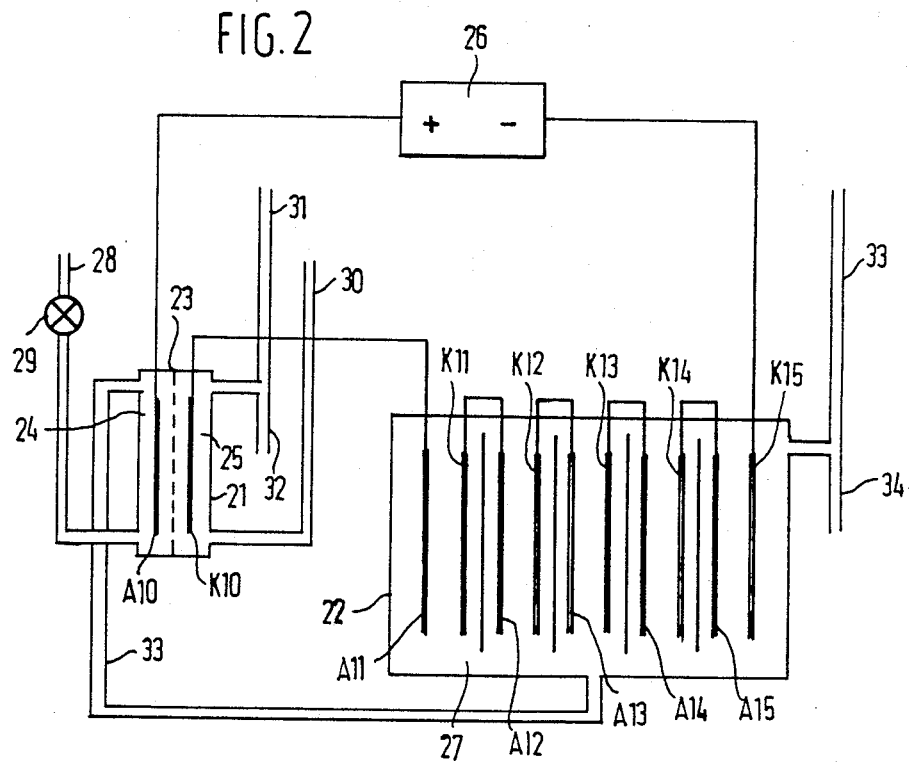
FIG. 2 is a schematic representation of an apparatus for carrying out the process according to the invention in its second embodiment.

FIG. 2 shows membrane cell 21 and a subsequent hypochlorite generator 22 connected thereto. The membrane cell 21 comprises one anode A10 and one cathode K10 and is divided by a cation-selective membrane 23 into an anode space 24 and a cathode space 25. The anode A10 is connected to the positive pole of an electric source 26.

The hypochlorite generator 22 comprises five electrically series-connected cell units each consisting of an anode A11, A12, etc. and a cathode K11, K12, etc. The anode and the cathode of a cell unit are not spatially separated from each other. Interposed between the cell units are partitions 27 in such a manner that the products of all cell units can freely mix together at the top of the cell. The anode A11 of the first cell is connected to the cathode K10 of the membrane cell 21; the cathode K11 of the first cell unit is connected to the anode A12 of the second unit; the cathode K12 of the second unit is connected to the anode A13 of the third unit, etc. The cathode K15 of the last unit is connected to the negative pole of the electric source 26.

The anode space 24 of the membrane cell 21 is fed via line 28 with an aqueous NaCl solution metered via a control valve 29. The mixture of chlorine gas and NaCl solution overflowing from the anode space 24 is discharged via line 33. The cathode space 25 is separately fed with NaCl solution via line 30. A mixture of chlorine gas and NaOH and NaCl containing solution overflows from the cathode space. The hydrogen gas escapes via separator 31 and the solution is discharged via line 32.

The hypochlorite generator 22 is fed with the mixture flowing through line 33. A mixture hydrogen gas and $Cl_2$-enriched, NaCl and NaOCl containing solution flows from generator 22. The hydrogen gas escapes via separator 33 and the solution is recovered from line 34 and can be used for disinfecting water, e.g. as described with reference to FIG. 1.

Figure 3A:
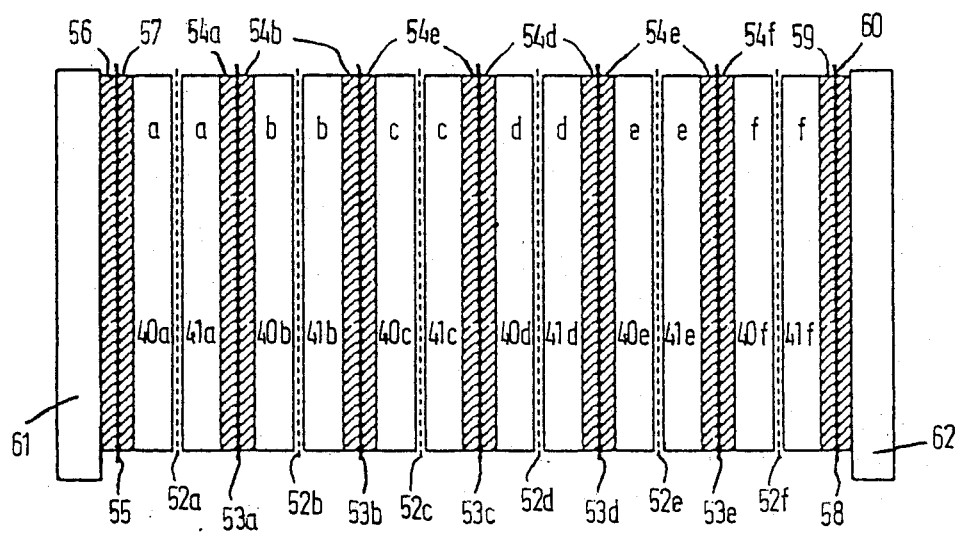
FIGS. 3A, 3B and 3C are a schematic representation of an apparatus for carrying out the process according to the invention in its third embodiment.

FIG. 3A shows an electrolytic cell composed of six subcells a through f and six anode compartments 40a through 40f and six cathode compartments 41a through 41f.

Figure 3B:
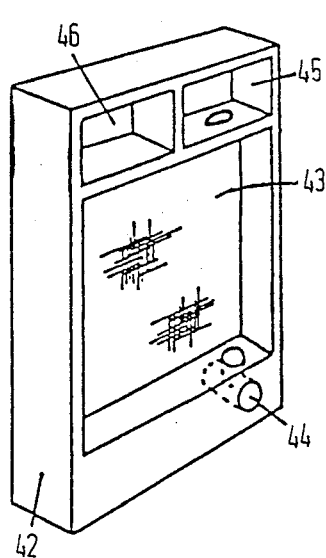
Figure 3C:
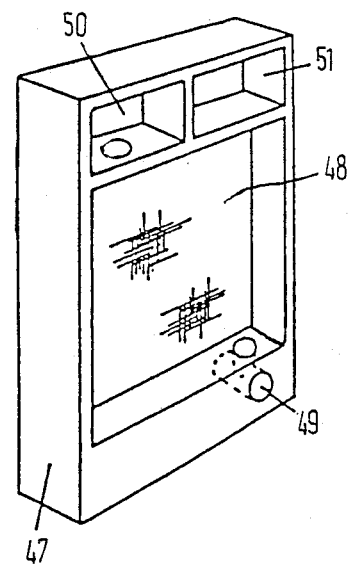

FIG. 3B shows the structure of an anode compartment, FIG. 3C the structure of a cathode compartment.

An anode compartment comprises a frame 42 enclosing an anode chamber 43 communicating with a supply passage 44 disposed at the bottom side of frame 42 and with a discharge passage 45 present at the top of the frame. The frame further contains a passage 46 which does not communicate with the anode chamber 43.

A cathode compartment comprises a frame 47 enclosing a cathode chamber 48 communicating with a passage 49 disposed at the bottom side of frame 47 and with a passage 50 present at the top of the frame. The frame further contains a passage 51 which does not communicate with the cathode chamber 48.

The cathode compartment for the subcell f has a different structure, in which the passage 49 does not communicate with the cathode chamber 48 and the frame comprises a supply passage opening into the cathode chamber.

Interposed between the first anode compartment 40a and the first cathode compartment 41a is a cation-selective membrane 52a. The compartments 40a and 41a together with the membrane 52a form a subcell. Analogous subcells are formed by the anode compartments 40b through 40f, the cathode compartments 41b through 41f and the membranes 52b through 52f. The membranes 52a through 52e comprise openings for the passages illustrated by FIGS. 3B and 3C. Membrane 52f comprises only openings at the passages 45 (FIG. 3B) and 51 (FIG. 3C).

In the cell, structure subcell b is placed against subcell a in such a manner that the anode compartment 40b of subcell b adjoins the cathode compartment 41a of subcell a. Interposed between the two subcells is a titanium electrode 53a provided on both sides with sealing isolators 54a and 54b.

In the manner described the subcells a through f are placed against each other.

The titanium electrodes 53a through 53e are provided on their sides facing the anode compartments with an active layer of platinum and iridium or a mixture of ruthenium oxide and titanium oxide or another suitable coating. These titanium electrodes function as bipolar electrodes.

The titanium electrodes 53a through 53e and the isolators 54a through 54e comprise openings at the passages illustrated by FIGS. 3B and 3C. The isolators 54a through 54e are further provided with openings at the anode and cathode chambers. Isolator 54f comprises only openings at the passages 45 (FIG. 3B) and 51 (FIG. 3C) and at the anode chamber of anode compartment 40f; the other passages are blinded.

Located on the left-hand side of anode compartment 40a is a titanium electrode 55 coated on the right-hand side with an active layer, as described above, and containing openings at the passages illustrated by FIGS. 3B and 3C. The anode 55 is provided on both sides with isolators 56 and 57 comprising an opening at passage 46 in anode compartment 40a. Isolator 57 also has an opening at the anode chamber of anode compartment 40a.

Located on the right-hand side of cathode compartment 41f is a titanium electrode 58 provided on both sides with isolators 59 and 60. The cathode 58 and the isolators 59 and 60 comprise openings at passages 49 and 50 of cathode compartment f. Isolator 59 also has an opening at the cathode chamber of cathode compartment 41f.

The cell structure is completed with closure plates 61 and 62 holding together all the parts of the cell by means of draw rods. Closure plate 61 comprises an opening at passage 46 in anode compartment 40a. Closure plate 62 comprises openings at passages 49 and 50 of cathode compartment 41f.

In the complete structure of the electrolytic cell the passages 44 and 49 together with the corresponding openings in the membrane, electrodes and isolators in subcells a through e form a continuous passage, the anolyte supply passage. In the same manner passages 46 and 50 together with the corresponding openings in the membranes, electrodes and isolators in subcells a through e and with the opening in closure plate 61 form a continuous brine supply and hydrogen collecting passage. Passages 45 and 51 together with the corresponding openings in the membranes, electrodes and isolators form an anolyte collecting passage extending at the top of all subcells a through f.

The thus composed electrolytic cell comprises five cells a through e having the same supply and discharge passages and, when being operated, performing the same function, and a separate subcell f whose anode chamber 40f communicates with the other subcells via the anolyte collecting passage.

The electrolysis is conducted as follows.

The positive pole of an electric source is connected to the anode 55 and the negative pole to the cathode 58. The intermediate electrodes 30a through 30e function as bipolar electrodes. The subcells a through f are therefore electrically series-connected.

The subcells a through e are fed with a brine containing, e.g., 200 g NaCl per liter, via the openings provided in closure plate 61 and isolators 56 and 57, and giving access to the brine supply and hydrogen collecting passage. The brine is distributed via the brine supply and hydrogen collecting passage over the cathode chambers of subcells a through e, flows via the anolyte supply passage into the anode chambers of subcells a through e and enters the anode chamber of subcell f via the anolyte collecting passage. The liquid reaction product leaves the electrolytic cell via passages 44f and 49f and the connecting openings in isolators 59 and 60 and closure plate 62.

During the electrolysis the cathode chamber of subcell f is separately fed with a brine containing, e.g., 30 g NaCl per liter, via the supply passage provided in the frame of cathode compartment 41f. The reaction products formed therefrom in the cathode space of subcell f and consisting of hydrogen gas and an aqueous NaCl and NaOH containing solution leave the electrolytic cell via passage 50f and the connecting openings in isolators 59 and 60 and closure plate 62.

In the cathode chambers of subcells a through a NaOH is formed during the electrolysis. The resulting aqueous NaCl and NaOH containing solution flows into the anode chambers of subcells a through e, in which the NaCl is partially converted into chlorine gas. In the anode chambers of subcells a through a and in the anolyte collecting line the products of the anode chambers are completely mixed with each other whereby the chlorine is bound to the NaOH to form NaOCl. The resulting NaCl and NaOCl-containing solution flows to the anode chamber of subcell f, in which the remaining NaCl is partially converted into chlorine gas enriching the NaOCl-containing solution and reducing the pH of the solution.

The final product has a pH of approximately 6 and is eminently suited for disinfecting swimming-water, dune-water, rinse water or waste water.

During the electrolysis hydrogen gas is formed in the cathode chambers of subcells a through e, which hydrogen gas escapes from the electrolytic cell via the brine supply and hydrogen collecting line and the connecting openings in isolators 56 and 57 and closure plate 61.

EXAMPLE

An electrolytic device, as schematically illustrated by FIG. 1, consists of a hypochlorite generator 1 having five cell units and a subsequent membrane cell 2 connected thereto and comprising one cell unit. The hypochlorite generator and the membrane cell are electrically series-connected. The positive role of an electric source 4 generating an amperage of 30 is connected to the anode A1 of the first cell unit of the hypochlorite generator and the negative pole thereof is connected to the cathode K6 of the membrane cell. The voltage is 25.

The hypochlorite generator 1 is fed with a brine containing 30 g NaCl per liter, via line 8 and control valve 9, in an amount of 19 l/h. The product of the hypochlorite generator overflowing into line 11 consists of an aqeous solution having a pH of 9.2, which comprises 0.5% chlorine bound as NaOCl and the unconverted NaCl.

The anode space 6 of membrane cell 2 is fed with the solution overflowing from the hypochlorite generator via line 11. The cathode space 7 is separately fed via line 12 with a brine containing 10 g NaCl per liter. In the anode space 6 the NaCl present in the solution is partially converted into chlorine which enriched the solution to reduce the pH.

The final product of the electrolytic device is recovered via line 15 and consists of an aqueous solution having a pH of 6.2 and containing 0.63% chlorine. This solution is eminently suited for disinfecting the swimming-water of a pool 16, the contents of which are 500 $m^3$, and which is visited by approximately 300 swimmers a day. A suitable control of switching on and off the electric source 4 by means of control device 19 results in that the swimming-water is kept at a chlorine content in the range of from 0.6 to 0.8 ppm and at a pH of 7.7 in the conventional water range, so that no pH correction is required.

COMPARATIVE TEST

For the purpose of explanation, the hypochlorite generator 1 illustrated by the Example is used without the subsequent membrane cell connected thereto for the preparation of the disinfectant.

The anode A1 of the first cell unit of the hypochlorite generator is connected to the positive role of electric source 4 generating an amperage of 30, and the cathode K5 of the fifth cell unit is connected to the negative pole. In this case the voltage is 19.

The hypochlorite generator is fed with a brine containing 30 g NaCl per liter, via line 8 and control valve 9, in an amount of 19 l per hour.

The solution overflowing into line 11, having a pH of 9.2 and containing 0.5% chlorine is directly used for disinfecting the swimming-water in pool 16. A control of switching on and off the electric source 4 by means of control device 19 results in that the chlorine content of the swimming-water is maintained at a value in the range of from 0.6 to 0.8 ppm, but the pH of the water thereby increases to approximately 8.3. In connection with the legal regulations the pH must be corrected by addition of acid.

For the preparation of 1 kg chlorine the hypochlorite generator consumes 6.1 kWh, and 200 l of brine must be passed through the generator.

When the system illustrated by the Example is used, the electrolytic device consumes 6.3 kWh for the preparation of the same amount of chlorine, and only 157 l of brine must be passed through the device.

This comparison shows that the invention enables a substantially improved degree of conversion of the NaCl at practically the same energy consumption. Moreover, correction of the pH of the treated water is rendered superfluous by the invention.

I claim:

1. A process for the preparation of a disinfectant for water which comprises the steps of first electrolyzing an aqueous NaCl solution in electrolysis cells to form either (a) in an hypochlorite electrolysis cell without a separated anode and cathode chamber, a residual NaCl solution containing electrolytically formed NaOCl; or (b) in an electrolysis cell having an ion-permeable membrane or diaphragm separating the anode and cathode chambers thereof, a residual NaCl solution containing dissolved electrolytically formed $Cl_2$; introducing the yield of (a) or (b) depending upon the configuration of said cell for the first electrolysis into a second electrolysis cell and further electrolyzing the solution (a) of NaCl containing NaOCl in a cell configured by an ion-permeable membrane to convert at least some of the residual NaCl in the solution to dissolved $Cl_2$ gas; or electrolyzing the solution (b) of residual NaCl containing dissolved $Cl_2$, in a cell configured to convert at least some of said residual NaCl in the solution to NaOCl; and then adding the resultant disinfecting mixture of NaCl, NaOCl and dissolved Cl to the water to be disinfected.

2. The process as claimed in claim 1, wherein the aqueous NaCl solution is initially electrolyzed in a first hypochlorite electrolytic cell group having a plurality of pairs of electrodes in which the products formed at the anodes and at the cathodes are not segregated from each other and thus form an NaCl and NaOCl-containing solution, (a) after which the resulting solution (a) is then further electrolyzed in one or more anode spaces of a second electrolytic cell which is electrically series-connected to said electrolytic cell and has one or more pairs of electrodes in which a diaphragm or ion-selective membrane is positioned between the anode and the cathode of the cell or each pair of electrodes, to segregate the electrolysis products of said second cell and then dissolving the segregated Cl gas product in said NaCl solution containing NaOCl.

3. The process as claiemd in claim 1 wherein the aqueous NaCl solution is initially electrolyzed in a first electrolytic cell group having one or more pairs of electrodes in which a diaphragm or ion-selective membrane is positioned between the anode and the cathode of the cell or each pair of electrodes to segregate the products of electrolysis in said cell, after which the products leaving the anode space(s) of said first cell group containing the aqueous solution of NaCl and $Cl_2$ are then electrolyzed in a second electrolytic cell group which is electrically series-connected to the first electrolytic cell group and has a plurality of pairs of electrodes in which the products formed at the anodes and at the cathodes are not kept separated from each other thus providing an NaCl solution containing NaOCl and enriched with dissolved $Cl_2$ for disinfecting water.

4. The process as claimed in 1, wherein said aqueous NaCl solution is electrolyzed in at least one or more electrically series-connected electrolytic cells, one group of said cells having a plurality of pairs of electrodes in which a diaphragm or ion-selective membrane is positioned to define spaces between the anode and the cathode of each pair of electrodes wherein the products segregated by said diaphragm or membrane leaving the anode and cathodes spaces are quantitatively mixed together to form an aqueous NaCl and dissolved $Cl_2$-containing solution after which the resulting solution is further electrolyzed in further cells connected in said series where said electrodes are not provided with said product segregating means.

5. The process according to claim 1 wherein the proportions of dissolved NaOCl and dissolved Cl in the resultant mixture are equilibrated by proportioning the number of series-connected cells of each configuration to achieve a substantially safe pH range.

* * * * *